3,565,605
PROCESS FOR THE CONTINUOUS REFINING OF METALS
Pierre Vayssiere, Metz Queuleu, France, and Juan Kindelan y Gomez de Bonilla, Madrid, Spain, assignors to Institut de Recherches de la Siderurgie Francaise, Saint-Germain-en-Laye, France
Continuation of application Ser. No. 431,427, Feb. 9, 1965. This application Jan. 15, 1968, Ser. No. 698,046
Claims priority, application France, Feb. 14, 1964, 963,736; Oct. 12, 1964, 991,114; 991,116; Oct. 23, 1964, 992,419; Nov. 26, 1964, 996,437
Int. Cl. C21c 7/00
U.S. Cl. 75—46     20 Claims

ABSTRACT OF THE DISCLOSURE

Processes for the continuous refining of metal containing slag-forming impurities comprising feeding the metal with the slag-forming impurities into a refining vessel, introducing therein refining gas so as to form a metal-slag foam, continuously transferring only this metal-slag foam into a decantation vessel, causing in the decantation vessel wherein the foam is transformed into liquid slag a concentration of the metal into a separate continuous metal phase, and separately discharging this liquid slag and the continuous metal phase from the decantation vessel.

---

The present application is a streamlined continuation application of U.S. patent application Ser. No. 431,427, entitled "Process and Apparatus for the Continuous Refining of Metals" and filed on Feb. 9, 1965, now abandoned.

The present invention relates to a process and apparatus for the continuous refining of metals.

There already exist a large number of processes for the continuous refining of metals, especially processes for the air or oxygen blast refining of pig iron. Among such processes can be mentioned those which consist in refining a metal in a vessel wherein the metal which is mixed with the slag during the refining operation flows out in a gyratory motion and is discharged through an opening located at the bottom of the vessel.

However, it has been found that the refractory material of which the calibrated-outlet nozzle is formed and through which the slag-metal mixture is discharged became rapidly damaged under the action of iron oxides which were inevitably formed.

A main object of the present invention is to provide a process for the continuous refining of metals under favorable conditions and which overcomes this drawback.

A further object of the invention is to provide a process particularly favorable in the case of refining with oxygen.

Another object of the invention is to build an apparatus for performing the above mentioned process.

With these objects in view the invention is directed to a process for the continuous refining of metals and more especially of pig iron, wherein refining substances are brought into contact with a liquid metal stream, characterized in that the metal is processed in at least one refining step during which a jet of refining gas which may or not contain in suspension slag making substances in powdered form is blown into said liquid metal stream with sufficient power to form in at least one refining vessel a slag-metal emulsion which is continuously discharged from said vessel by overflow into a consecutive vessel, in that a decantation of the emulsion formed in the last vessel is carried out and the metal and slag are discharged separately.

The above process may also comprise one or a number of the following features:

(a) There is one refining step and one refining vessel into which is blown in addition to the refining gas which produces the slag-metal emulsion a second jet of non-penetrating oxidizing gas, said second jet being introduced into the midst of the emulsion in such a manner that practically the entire volume of said second jet is contained within said emulsion in order that the CO which is given off by the refining process may be converted to $CO_2$ by combustion and in order to communicate the heat of this combustion to the emulsion.

(b) There is one refining step and one refining vessel as well as a second vessel and the auxiliary oxygen which may or may not contain a powdered flux in suspension is blown on the slag phase into said second vessel in order to improve the fluidity of said phase.

(c) There are at least two successive refining steps during each of which a slag-metal emulsion is continuously formed in a same number of refining vessels, and a decantation is effected between two refining steps for the purpose of removing the slag which is formed.

(d) There are at least two successive refining steps during each of which a slag-metal emulsion is continuously formed in a same number of refining vessels and the slag derived from the last decantation process is recycled towards the vessel in which the first refining step takes place.

The invention also contemplates an apparatus for performing the above stated process comprising at least one vessel or so called reactor and at least one decantation vessel placed after the last reactor, means for feeding a liquid metal stream into said reactor, means for blowing a refining gas into said reactor, means for discharging the slag-metal emulsion from said reactor and located at a level which is higher than the level of introduction of metal substances to be refined, and means for discharging from the decantation vessel the products which are separated out by decantation.

According to another feature of the device provision is made for a single reactor which is joined to means for forming a stream of metal to be refined and a decantation vessel communicating with said reactor via a refractory-lined passageway and provided with a first and a second opening placed at different levels for the purpose of discharging the two liquid phases after separation.

It will be understood that the present invention permits the possibility of refining a metal as a continuous process under particularly favorable conditions. For this purpose, use is made of an effect which is usually troublesome to those who are skilled in the art, namely the formation of a slag-metal emulsion, which is assisted by the depth and penetrating power of refining materials within the bath. The emulsion is particularly abundant in the case of refining with oxygen since the volume occupied by the emulsion is double and sometimes even three times that which is occupied by the initial liquid phase. By refining materials is meant not only oxygen whether in the pure state or not, but also powdered materials such as ore and liquid materials such as premolten slags. By slag making materials are meant powdered products such as lime.

There is thus obtained an emulsion which is composed of a nonmetallic phase having a base of FeO, $SiO_2$, MnO, CaO, MgO, of refining products such as oxygen and of a metallic phase in the state of fine droplets.

In point of fact, it is well known that the reactions are assisted by the fine division of the material; under these conditions, elements such as silicon, carbon, manganese, phosphorous which are contained in the metal are rapidly oxidized in intimate contact with the refining products and the fine droplets of metals are refined in a very short time.

The refined slag-metal emulsion passes into a refining vessel, then overflows through an opening into a second vessel. As soon as the emulsion is no longer in contact with the refining materials, the droplets in suspension combine and form two liquids which readily separate out by reason of their very different densities.

Part of the gas which is derived from the refining process and which contains a high percentage of CO can be drawn out by virtue of a slightly reduced pressure within the metal-intake duct in which said gas can be ignited in the presence of an oxidant or combustive element such as air or oxygen. The combustion of the gas can be regulated in such a manner as to ensure that the temperature of the liquid metal to be refined will thus be maintained and even increased.

The remainder of the gas can be drawn into the second vessel and can be partially burnt therein by virtue of the suction of air since said second vessel communicates with the atmosphere. The refined metal is heated by the above combustion process without being oxidized, however, since it is covered with a protective coating of slag.

It can be visualized that, in the case of a continuous refining installation, one of the difficulties to be solved consists in maintaining the thermal levels at all stages of the operation. Even in the case of an installation which is designed for production on a commercial scale, the deliveries of slag and of metal remain relatively low. In fact, in the case of a steel production capacity of 60 tons per hour, the outputs are only of the order of 1 ton per minute in the case of the metal, that is to say 130 liters per minute, and 100 kilograms per minute in the case of the slag.

As a result of the low output of slag, there is therefore a danger that the slag may partially freeze within the discharge opening and subsequently produce a blockage in a fairly short time. In addition, it can happen as a result of an accidental irregularity in the refining process within the first refractory-lined vessel that, after decantation, the slag is of too thick consistency to flow correctly. The present invention provides a means of fluidifying the slag whenever this should prove necessary and thus to regularize its flow.

An excellent means of improving the thermal balance of the refining process and of maintaining thermal control over this latter is to convert into $CO_2$ by combustion the CO which is given off in the first vessel so as to recover the combustion heat. In practice, this method is liable to give rise to difficulties by reason of the high temperature which is reached in that case by the gases, since the CO is already evolved at a temperature within the range of 1500 to 1600° C. The refractory materials of the device are particularly likely to be affected by such temperatures. The present invention proposes to overcome this difficulty by discharging the heat of combustion of CO into $CO_2$ into the midst of the foam or emulsion which is formed by the refining process. As a consequence, this heat is directly absorbed by the slag and the metal, thus improving the overall thermal balance and the refractory materials are protected from any overheating. It has been found in the course of actual tests that heat is in fact effectively absorbed by the emulsion and that the temperature of the gases which are exhausted from the reactor is not increased, whereas the $CO_2$ content increases to a considerable extent, thus demonstrating that a high percentage of CO is in fact converted into $CO_2$ as a result of combustion. It will be apparent that thermal adjustment can be either wholly or partially effected by regulating the quantity of CO which is burnt, this being achieved by regulating the quantity of oxygen which is thus blown into the foam.

In certain difficult cases, particularly in the case of very small installations and in the event that it should prove difficult to carry out the thermal adjustment, means can be provided for introducing into the liquid metal external heat which does not produce any physico-chemical action. Among these means can be mentioned by way of nonlimitative example electromagnetic induction heating, electric arc heating, plasma torch heating and so forth.

It is observed experimentally that the process of refining by formation of emulsion does not in practice give rise to the formation of abundant red fumes. This characteristic feature, for which a number of explanations can be advanced although the true underlying cause is not yet known, constitutes one of the main advantages of this process.

The metal which is produced at the output of the second vessel has been subjected to a conventional refining process and the product obtained can still contain, for example, percentages of sulphur or of phosphorus which may be incompatible with the use for which the product is intended. Provision is accordingly made in a third vessel for processes which accompany the formation of slags with a view to obtaining a metal having well determined characteristics.

The metal can thus be dephosphorized in accordance with a known process which consists in blowing by means of an inclined nozzle which is placed level with the surface of the metal oxygen containing lime and fluorspar in suspension. Since the point of impact of the jet surface of the bath to its periphery, the slag which is formed circulates in a general movement of rotation about the center of the surface of the bath. This known process as applied to the present invention permits of continuous dephosphorization of the metal and continuous discharge of the slag which is formed.

It is also possible to apply to the present invention a continuous blowing of coke dust, the liquefied ashes of which float on the surface and are continuously discharged; a blowing operation as thus contemplated permits of recarburization of the metal.

Among the processes which accompany the formation of slags can also be mentioned the known process of desulphurization which consists in injecting a neutral gas containing lime in suspension and in liquefying immediately afterwards by addition of fluorspar; another method of desulphurization which also results in deoxidation consists in obtaining these effects by means of a molten slag. These processes can very readily be applied in a continuous manner to the process in accordance with the invention since the slag formed is discharged through an opening as soon as its consistency reaches a certain value.

At the outlet of the third vessel, the metal has practically the desired analysis. However, it is useful to carry out a final treatment of the metal in a fourth vessel. This treatment can be a deoxidation process.

Provision can also be made in said fourth vessel for a stirring system whereby the metal is stirred or agitated, for example, by blowing continuously a neutral gas such as nitrogen through porous bricks placed in the bottom of a container which forms the fourth vessel. This stirring action has the intended effect of homogenizing the metal prior to casting this latter in the ingot-molds.

A metal can be further refined in at least two different stages by formation during each stage of a slag-metal emulsion. The emulsion which is formed and which is of different composition in each stage, flows through the device by overflow, is decanted at least at the end of the operation in which the slag and the metal are discharged separately.

To this end, a stream of crude metal such as pig iron is fed into the bottom of a vessel or so-called primary reactor. A jet of refining gas such as oxygen which can if necessary contain in suspension powdered materials such as powdered lime is injected above the liquid bath by means of a nozzle. There is then formed a slag-metal emulsion which considerably increases the initial volume of the liquid bath and overflows into a second reactor in which a second emulsion is formed. The volume of emulsion formed by a kind of foaming of the slag and of the metal essentially depends on refining conditions such as oxidation of the slag, agitation and so forth which are in turn dependent on the method and conditions of blowing, namely on the flow rate of gas, height of the blowing nozzle, penetration of the jet, and so on. The blowing operation is naturally carried out in such manner as to assist the production of foam to the required extent. The depth of the emulsion can be regulated by producing action in particular on the height of the nozzle and on the divergence of the jet, the conditions of gas flow and materials being also determined by metallurgical considerations. Should this prove necessary, a complementary action can be exerted on the depth of the emulsion by means of the pressure which prevails within the reactors. In fact, it can be observed that an increase in pressure can result in a reduction in foam development. However, this mode of action is relatively difficult to carry into practice and does not usually prove necessary.

When the metal to be refined is phosphorous pig iron, the treatment in the first reactor has the effect of oxidizing among others a substantial proportion of the phosphorus which is contained in the pig iron and which passes into the emulsion in the form of phosphated slag, this conversion being due to the highly basic medium which is produced by the lime. In this case, in a preferred embodiment of the invention, there is placed after the primary reactor a container or so-called primary decanter in which the emulsion formed is separated out by decantation in order to remove the phosphated slag. The slag is then discharged through an orifice placed above the level of liquid metal and through a spout. The slag can then be advantageously granulated directly as it passes out of the decanter, for example by a continuous compressed-air process, thus facilitating its withdrawal and later handling operations.

The refined metal is transferred from the primary decanter to a secondary reactor in which the refining and dephosphorization processes are continued by means of the blowing of a second jet of refining gas which can also contain in suspension the lime or refining materials such as ore; there is formed a secondary emulsion which passes either into a third and then a fourth reactor and so forth or directly into a final decanter.

It will be understood that, after a certain period of operation by means of the method according to this invention, it proves necessary to shut down the installation in order to carry out routine operations involving maintenance of vessels (reactors, decantation vessels or others) and especially relining operations.

It is therefore advisable for reasons of safety and convenience, for example in order to prevent the formation of skulls in a refining vessel, to form in the bottom of the vessels an opening which is closed off in normal operation but by means of which the entire contents of said vessels can be drained off whenever necessary.

A preferred mode of operation of the device in accordance with the invention consists in forming said opening at the center of the actual base of each vessel. It is known that units containing liquid metals are subject to a greater degree of wear at the center of the base than at the edges. If a lateral opening is formed at the bottom of the apparatus, there is thus created a central depression or basin which will not drain off at the time of emptying of the appartus, thus forming a skull which has to be cleared before restarting; this operation must as a rule be followed by a relining operation.

The opening which is formed at the center of the actual base of the vessel circumvents these drawbacks. Thus, all of the metal contained within the vessel is drawn off and the lining can be used again for another run. By means of the device described, draining off operations are by no means frequent but it is preferable in such cases to ensure that stoppages are reduced to a minimum.

It can also happen that the operation of the apparatus has to be interrupted for a relatively short period of the order of a few minutes. By dividing the second vessel into two compartments which communicate with each other at the bottom, there is thus formed a siphon for the decanted liquid metal. The emulsion being poured into the first of these compartments, the slag floats on the surface and cannot pass into the second compartment in which only metal is therefore present. The slag is discharged through an opening located at the top level of the first compartment whilst the metal is discharged through an opening of the second compartment which is located at a sufficiently high level to ensure that there always remains an appreciable quantity of metal within the decantation vessel. This arrangement has the advantage of considerably facilitating the adjustment of the different flow rates of the installation and to establish the levels of the decantation vessel. Moreover, the arrangement referred-to permits of stoppages of operation without excessive cooling of the bath by reason of the thermal inertia of the liquid mass. The cooling can also be compensated by the addition of heat from an external source and by any known means such as a burner, electric arc, plasma torch, electromagnetic induction and so forth in a sufficient quantity to maintain the temperature of the bath. An introduction of heat from an external source, especially if it is chemically neutral as is the case in particular with a plasma torch, can usefully be employed during operation in order to restore the heat balance of the operation from time to time, for example in the event of intermittent operation.

As has been stated in the foregoing, this invention is not limited to any particular number of reactors and decanters. Naturally, when a number of reactors are provided, it can be advantageous to employ in each reactor at least one nozzle, the outlet orifice of which is directed towards the bottom of the reactor.

In the particular case of the process which is applied to phosphorous pig iron, it is to be expected that the slag which is withdrawn from the final decanter can contain over 20% iron in the form of FeO. This ferrous oxide can be recycled in the primary reactor for recovery of the iron. If the oxide is sufficiently fluid, there is employed for this purpose a refractory conduit which can be heated if so required by auxiliary external means. In fact, as a result of the action produced by the increase in volume and overflowing of the emulsion, the slag which is discharged from the final decanter can be located at a higher level than the level of admission of the crude metal within the first reactor and can therefore be brought into said first reactor under the action of gravity. Should the slag not be sufficiently fluid to permit this mode of operation, it will in that case be conveyed into the first reactor by any suitable mechanical means. It would be possible, for example, to subject the slag to a coarse granulation by a jet of compressed gas and then to feed the slag into the reactor through a hopper.

In order that the invention may be clearly understood, there will now be described a number of examples of practical application which are not given in any sense by way of limitation, reference being made to the accompanying drawings, in which.

Figure 1:
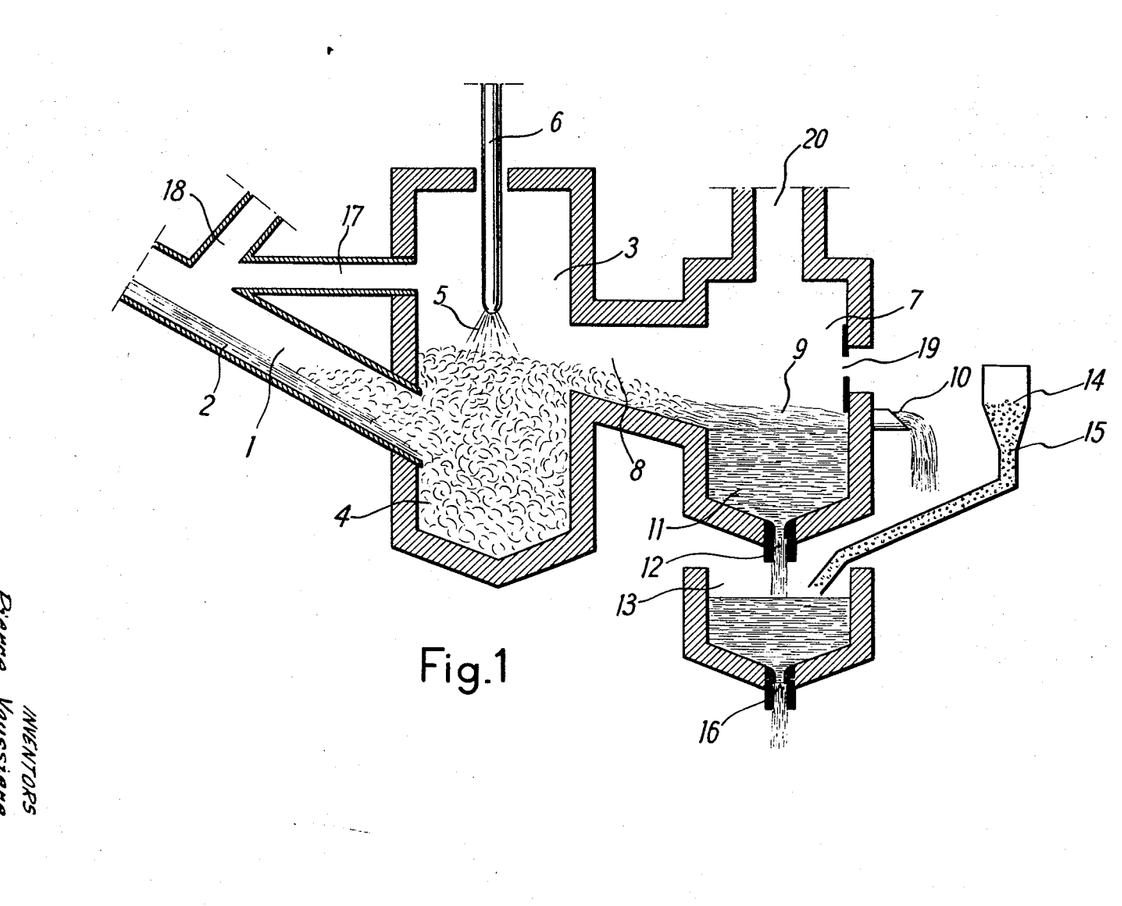
FIG. 1 illustrates in diagrammatic vertical cross-section the essential part of a processing device in accordance with the invention, which comprises a refining reactor.

The reference 1 in FIG. 1 designates the refractory-lined duct for the supply of liquid metal 2 to be refined. The liquid metal flows into a refining vessel 3 in which the metal forms a slag-metal emulsion 4 with the refining materials 5 which are blown in through the nozzle or lance 6. The emulsion 4 in which the metal has been refined overflows from the refining vessel 3 and passes into a second vessel 7 through a refractory-lined passageway 8. It is found that the emulsion does not rise within the refractory-lined duct for the supply of metal to be refined, in all probability by reason of the contrary flow of subjacent liquid metal In the second vessel 7, the emulsion is separated out: the slag of low density floats on the surface at 9 and is discharged through the overflow spout 10; the refined metal which has a higher density occupies at 11 the bottom part of the vessel from which it is withdrawn through the nozzle 12 with calibrated orifice. It will be noted that, at this stage, the metal is completely freed of slag, which is the principal cause of damage to refractory material; the nozzle 12 of ordinary refractory material will accordingly have a longer service life.

The refined metal which is discharged through the nozzle 12 is collected in a third vessel 13 in which the refined metal is deoxidized by means of the feeder 14 by adding ferromanganese 15. The metal is discharged through the calibrated-orifice nozzle 16 and can then be poured into ingot molds.

Part of the refining gas which is produced within the vessel 3 is discharged through the duct 17; the gas is contacted with air supplied through the duct 18 and is accordingly ignited inside the duct 1, thus heating therein the metal to be refined.

The remainder of the refining gas is discharged through the refractory-lined passageway 8 and is partially burnt in the vessel 7 by virtue of the intake of air which is drawn in through the adjustable opening 19; said intake of air is produced by a regulated partial vacuum or reduced pressure within the chimney 20 through which the gases are discharged through a collecting system which is now well known.

Figure 2:
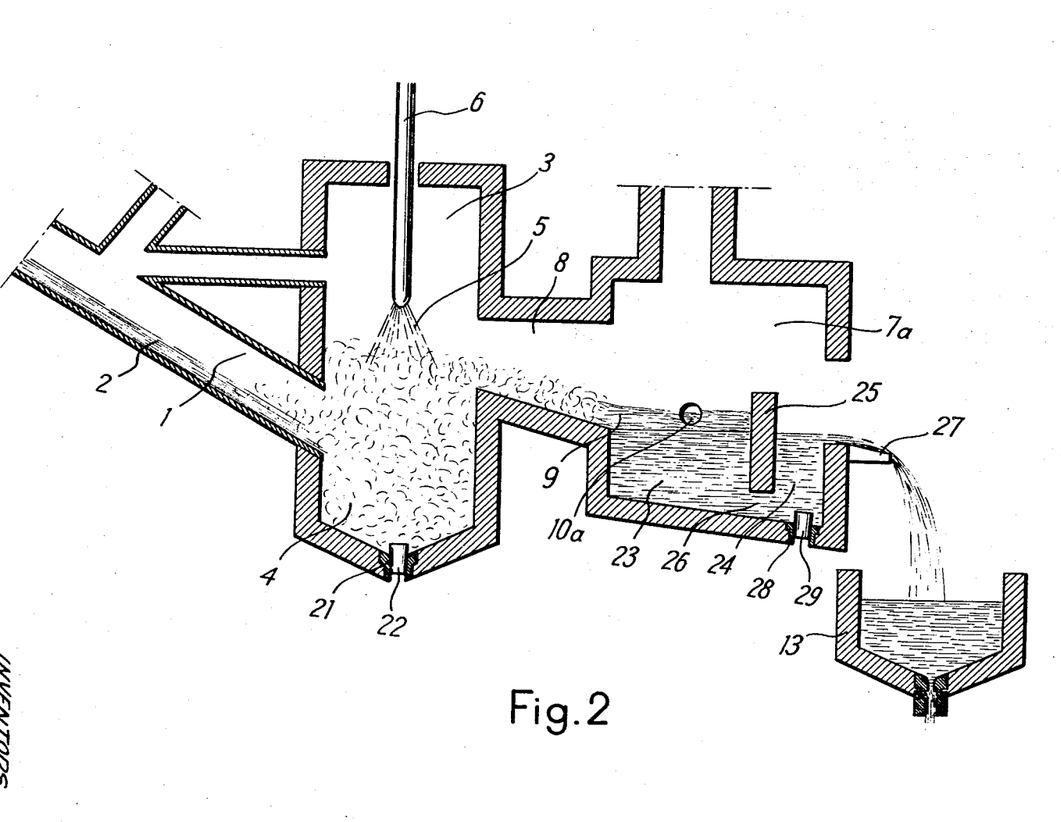
FIG. 2 is a similar view of a device showing more specifically a decantation vessel which is separated into two compartments by a partition wall.

FIG. 2 illustrates a device which is similar to that of FIG. 1, but with further improvements. There is again shown the refractory-lined duct 1 for conveying the metal 2 to be refined into the refining vessel 3 in which the refining reaction takes place with resulting formation of the metal-slag emulsion 4 by means of a jet 5 of refining substances, especially oxygen, which is blown in by means of a nozzle 6 which is cooled by water circulation in the usual manner. For this reason, said first vessel is referred to hereinafter as a "reactor." The base of the reactor 3 is fitted with a kind of small outlet nozzle 21 which is held within the lining and closed off during normal operation by means of a plug 22 of refractory material. The plug 22 can be driven out mechanically and burnt with oxygen for the purpose of clearing in the event of stoppage of the installation or each time it may be desired to drain out the reactor completely.

The metal-slag emulsion passes through the refractory-lined passageway 8 into a second vessel 7a in whch the decantation of the metal and the slag takes place and which is known as a "decanter." The decanter is divided into two compartments 23, 24 by a partition wall 25 which forms a passageway 26 at the bottom of the vessel. The slag 9 is retained within compartment 23 by the wall 25 of refractory material and flows out through the overflow orifice 10a, whilst the metal floods compartment 24 and flows out through an overflow spout 27 into the vessel 13. The decanter 7a has a sloping bottom which is fitted at the lowermost point with an outlet nozzle 28 and a plug 29 of refractory material for draining off purposes as in the case of the reactor.

The plugging means 29 prove useful if the metal is discharged normally through the bottom of the second vessel by means of the outlet nozzle as hereinabove described. In fact, at the moment of starting up of the installation, it is advantageous to provide for the filling of the second vessel before allowing the metal to flow out through the outlet nozzle; this filling operation ensures thermal inertia of the liquid bath and prevents the discharge of the first slag through the outlet nozzle.

Figures 3, 4:
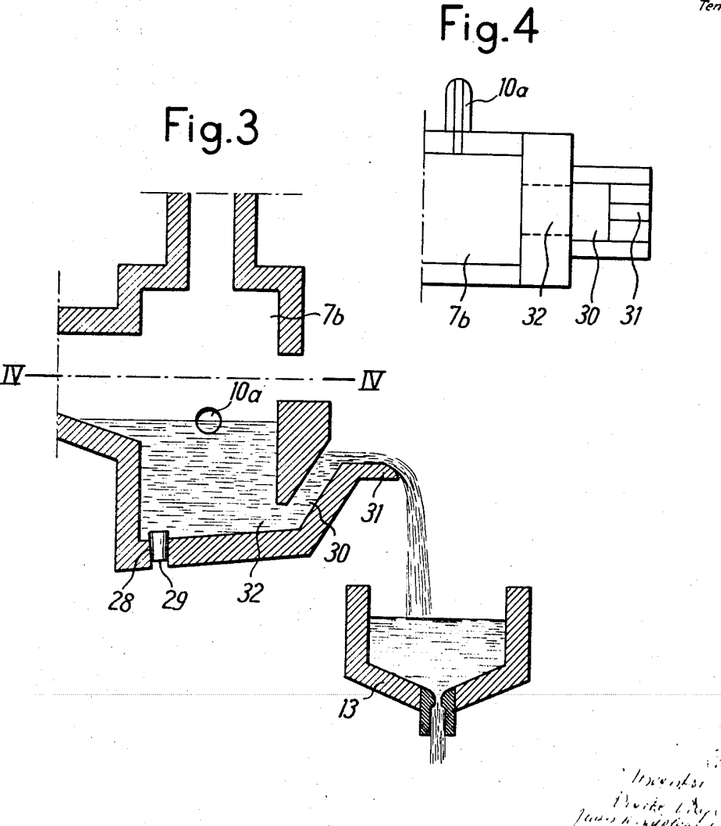
FIG. 3 shows in diagrammatic cross-section a decantation vessel having the shape of a teapot.
FIG. 4 is a diagrammatic view in cross-section taken along the line IV—IV of FIG. 3.

There is shown in FIGS. 3 and 4 another form of embodiment of decantation vessel 7b which is not provided with a separating wall. There extends from the bottom of the vessel a refractory-lined riser 30 which terminates in an overflow 31 for the liquid metal. The decantation process takes place in the vessel 7b and the metal flows into the duct 30 through an opening 32 formed at the base of the vessel. The supernatant slag is discharged as in the previous example through the lateral overflow orifice 10a. The vessel 7b is also provided with a draining off outlet fitted with an outlet nozzle 28 and a plug 29 of refractory material.

As has been mentioned earlier, it is an advantage to employ a second jet of nonpenetrating oxidizing gas, said jet being introduced into the midst of the emulsion in such a manner that substantially the entire volume of said second jet is enclosed within said emulsion in order that the CO which evolved as a result of the refining process is converted into $CO_2$ by a combustion and so that the heat thus generated is communicated to the emulsion. This mode of operation is shown in FIGS. 5 and 6.

Figures 5, 6:
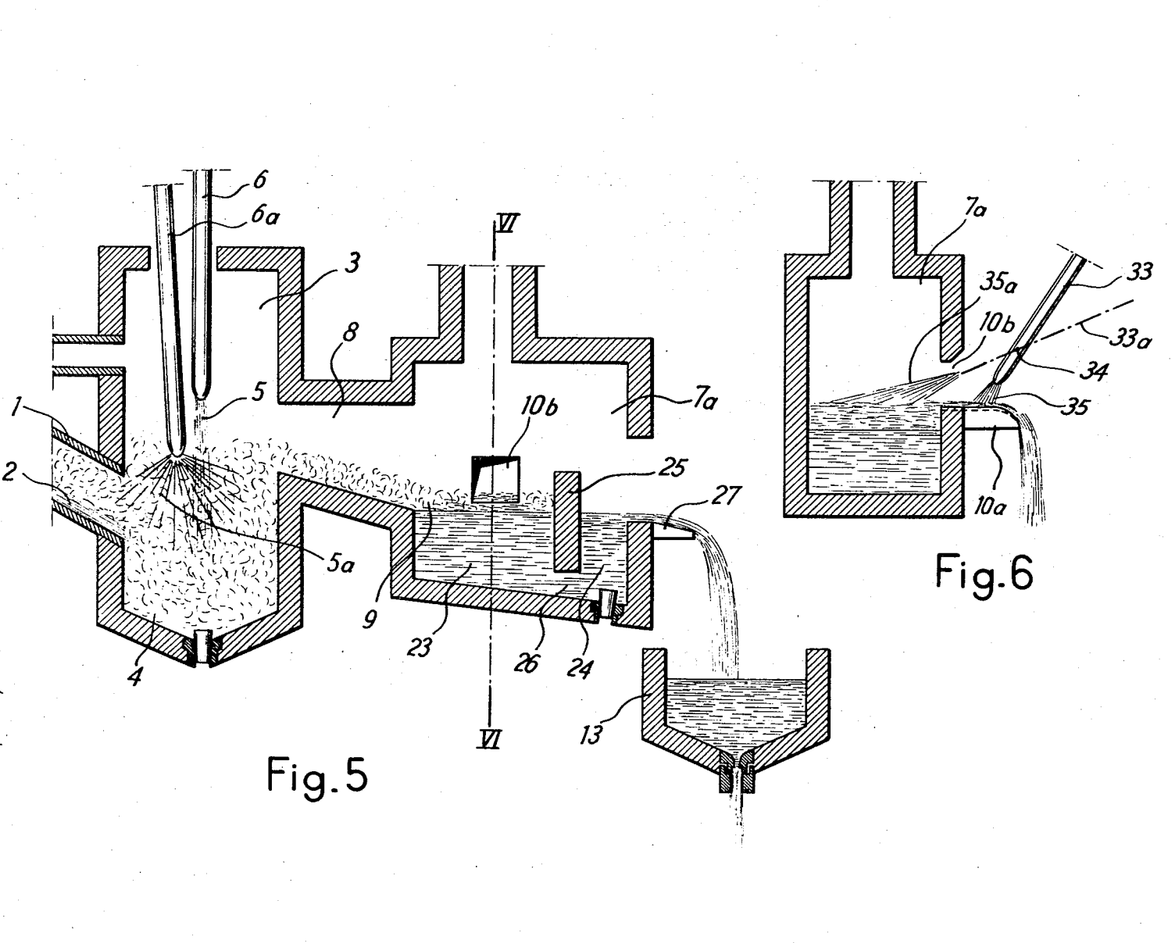
FIG. 5 is a similar view of a device for the practical application of an alternative form.
FIG. 6 is a view in cross-section taken along the line VI—VI of FIG. 5.

There can be seen in FIG. 5 the jet 5 of refining substances which is concentrated and endowed with a fairly high velocity in such a manner as to have a high penetrating power and to pass through the emulsion to the full depth thereof so as to finally react with the entering stream of pig iron and initiate the formation of an abundant foam having a thick consistency. It is endowed with a large quantity of movement. In order to burn the carbon monoxide which is derived from the refining reaction, there has been inserted in the reactor a second nozzle 6a, the extremity of which comes into contact with the emulsion or even penetrates therein. Said nozzle supplies a very wide jet 5a of oxygen or air to which is imparted a very low velocity, thus covering the entire active surface of the reactor without reacting with the pig iron. The CO which rises through the foam is burnt at least partially by the oxygen of the jet 5a and the heat which is thus given off in the midst of the foam is absorbed by the foam itself without in practice reaching the walls of the reactor since the heat transfer in the midst of the emulsion is excellent by virtue of the finely divided state of the substances. During tests performed with an experimental installation in accordance with the description, we have been able to demonstrate the evidence of a very distinct improvement in the thermal balance which is achieved by virtue of the above-mentioned additional introduction of oxygen by blowing. In the case of an input of pig iron of 1 ton per minute, the volume rate of flow of refining oxygen through the jet 5 was approximately 55 cubic meters per minute. Approximately 25 cubic meters per minute of technically pure oxygen was blown in through the nozzle 6a, thereby permitting the injection through the main nozzle 6 of an additional quantity of 80 kilograms per minute of ore with a 60% iron content, said ore being in suspension in the refining oxygen. The refining gases discharged from the apparatus contained approximately 60% $CO_2$ and the temperature of said gases was approximately 1650° C., representing only a slight increase with respect to the temperature without blowing in through the nozzle 6a.

The thermal balance can be adjusted during operation to a certain extent by adjusting the rate of CO which is converted to $CO_2$ by combustion, either by regulating the flow rate of oxygen supplied through the nozzle 6a or by modifying the rate of combustion by means of a nozzle with variable jet divergence. Nozzles of this type are well known in the present state of the art. It would, of course, also be possible to regulate the quantity of ores or other cooling additions which are injected, but this gives rise to a disadvantage in that a variation is thus produced in the hourly production of the installation.

The slag which is decanted in the compartment 23 is discharged through a lateral opening 10b and flows out through the overflow 10a into a vessel which has not been illustrated in the drawings, unless the slag is granulated by any suitable method. The opening 10b is enlarged so as to permit of a light blowing of oxygen such as will be described hereinafter. Provision has been made for a small nozzle 33 which may if necessary be cooled by a circulation of water in known manner and which is capable of taking up two end positions, the axes of which are shown in FIG. 6, by carrying out a movement of rotation about a fixed point 34. In the position which is shown, said nozzle can blow an oxygen jet 35 onto the sill of the opening 10b and onto the overflow 10a when these latter are clogged by slag which has set. In the other end position which is indicated by the axis 33a, the nozzle is directed towards the center of the surface of the slag so as to blow oxygen and possibly also fluorspar or any other suitable flux for the purpose of fluidifying the slag when the consistency thereof is too thick.

Finally, should it prove necessary to improve the thermal control, heat can be introduced in the liquid metal from the exterior either into the compartments 23 and 24 or into the blending vessel 13. There are employed for this purpose methods of heating which do not produce any chemical action on the bath. Among said methods can be mentioned the plasma torch, a number of models of which are now commercially available. This method is particularly advantageous since it permits of very flexible utilization, has good thermal efficiency and does not call for any current-supply point in contact with the bath as is the case with the single-phase electric arc system.

In the forms of embodiment which have been previously described, the metal produced at the outlet of the second vessel has been subjected to a conventional refining treatment and the product obtained was still liable to contain proportions of sulphur or phosphorus which may prove incompatible with the particular use for which the metal is intended. It is for this reason that, in certain cases, provision must be made within a third vessel for other processes with formation of slags in order to obtain a metal which has the requisite characteristics.

Figure 7:
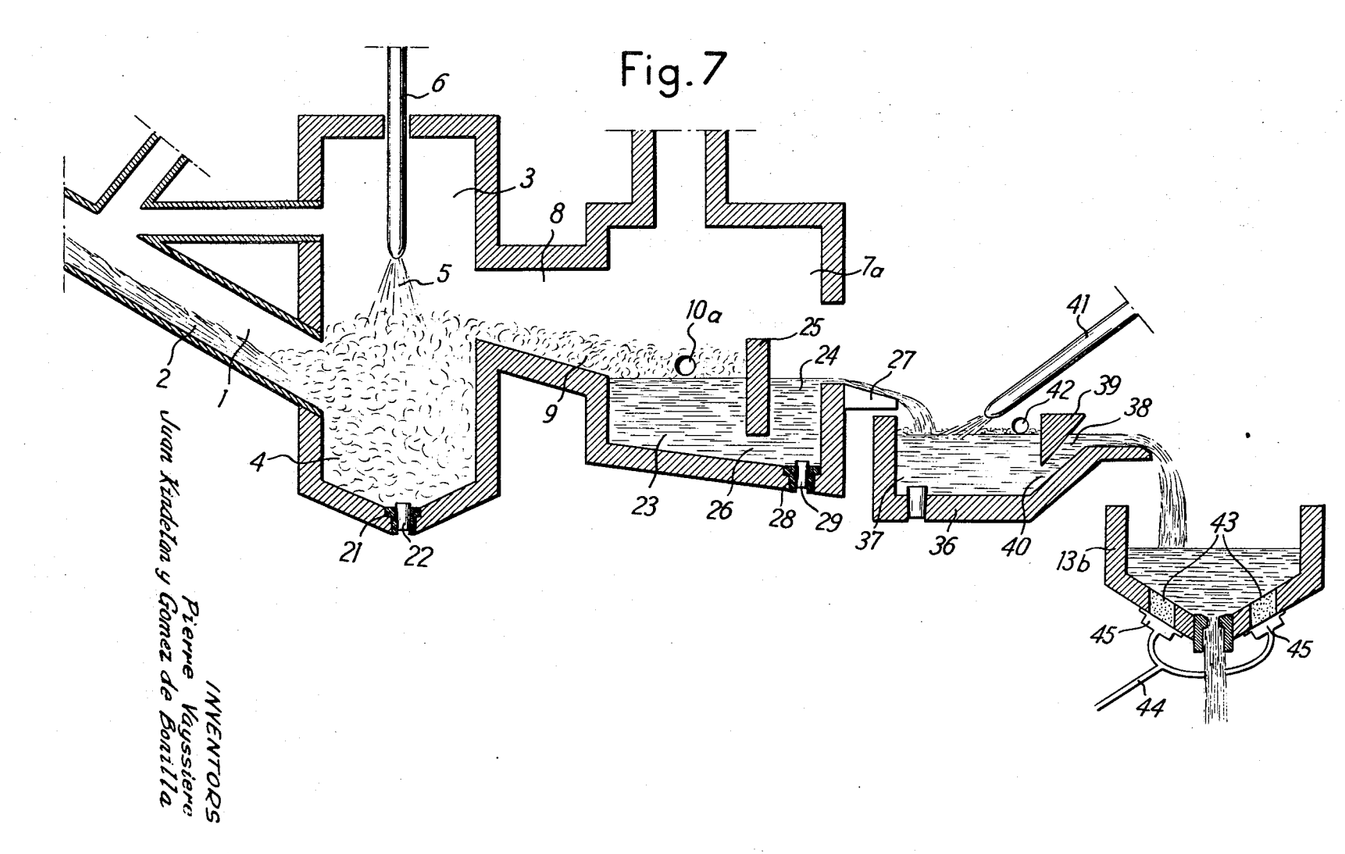
FIG. 7 is a similar view of another alternative form of practical application of the process according to the invention.

FIG. 7 shows a mode of operation as contemplated hereinabove. There is shown in this figure a reactor 3 and a second vessel 7a, both vessels being similar to the units which are shown in FIG. 2. The operations are carried out as in the previous cases and the separation of the slag phase from the metal phase takes place within the vessel 23. The metal passes into compartment 24 and flows into a vessel 36 which is divided into two compartments 37 and 38 by the partition wall 39 in which is formed an opening 40 providing a communication between said compartments.

The metal which passes into compartment 38 flows out into a vessel 13b from which it is poured into ingot molds, not shown in the drawings.

The metal derived from the vessel 7a is processed in the vessel 36. A nozzle 41 serves to blow in line and fluorspar in suspension in oxygen with a view to dephosphorizing the metal. The slag then formed is continuously discharged through an opening 42 formed in the wall of vessel 36.

The bottom of the vessel 13b is fitted with porous bricks 43 through which is blown nitrogen supplied through a pipe 44 and which passes through boxes 45.

Thus, the metal which is refined in continuous operation within the vessels 3 and 7a is dephosphorized at 36 and homogenized at 13b, also in a continuous manner.

Figure 8:
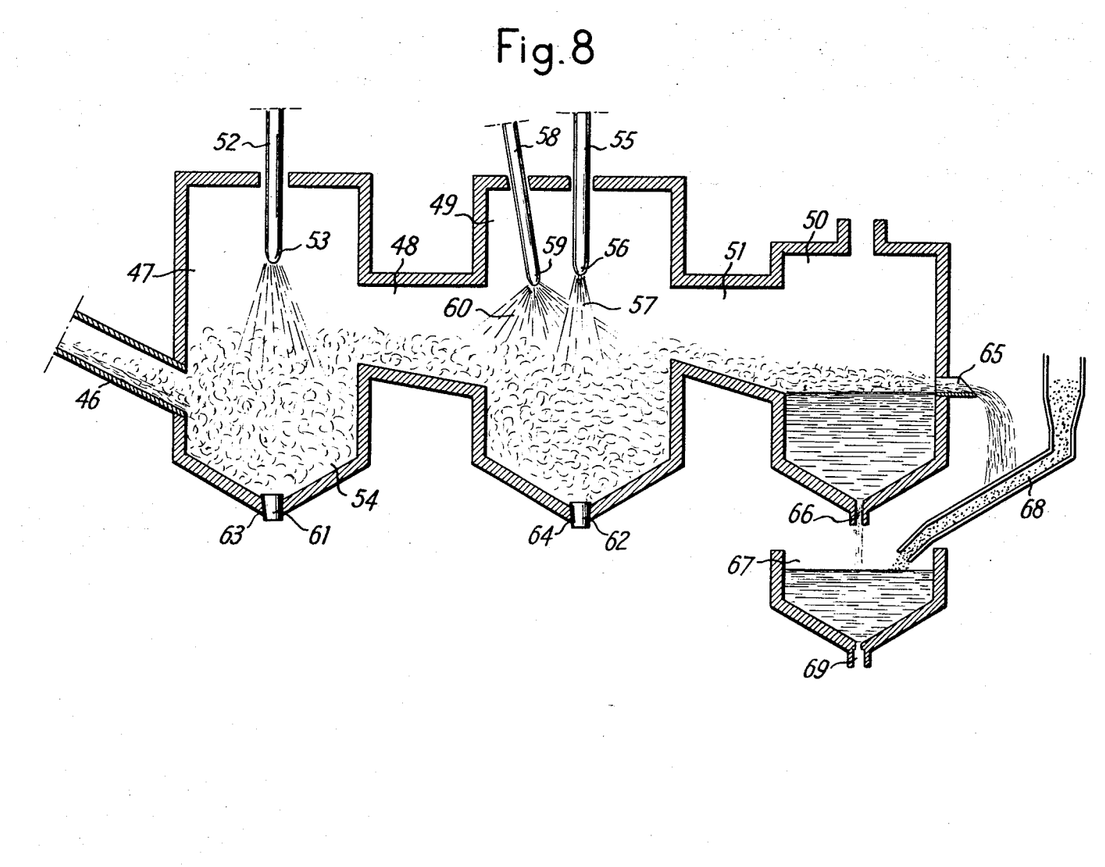
FIG. 8 is a similar view of another alternative form.

The foregoing examples related to the case in which only one reactor was provided. This invention is not limited to any particular number of reactors and FIG. 8 illustrates a form of embodiment comprising two reactors in succession followed by a decantation vessel. There has been shown at 46 a duct which extends from a flow-regulating buffer tank. The duct 46 supplies crude pig iron to a primary reactor 47 which communicates via a passageway 48 with a secondary reactor 49. The secondary reactor 49 communicates with a decanter 50 via a passageway 51. A nozzle 52, the mouthpiece 53 of which is directed downwards serves to blow into the reactor 47 a jet of oxygen containing powdered lime in suspension. This jet forms with the pig iron an emulsion 54 which passes by overflowing into the passageway 48 then into the secondary reactor 49. A nozzle 55 having a mouthpiece 56 serves to blow a penetrating jet 57 of oxygen containing in suspension a mixture of powdered lime and ores which have been prereduced to granules. In the same reactor, a nozzle 58 having a mouthpiece 59 produces a divergent jet 60 of oxygen which initiates the combustion of part of the carbon monoxide which is formed at the time of the refining operation. Plugs 61 and 62 which are placed respectively in the openings 63 and 64 of the reactors 47 and 49 permit the draining out of these latter in the event of stoppage. The emulsion 54, the composition of which has been modified by the jet 57 is separated out in the decanter 50. The slag is discharged through a spout 65 whilst the refined metal flows out through an outlet nozzle 66 into a blending vessel 67 into which is directed a device 68 for feeding deoxidizing products such as ferromanganese or ferrosilicon. The metal which is thus processed is discharged through the outlet nozzle 69.

Figure 9:
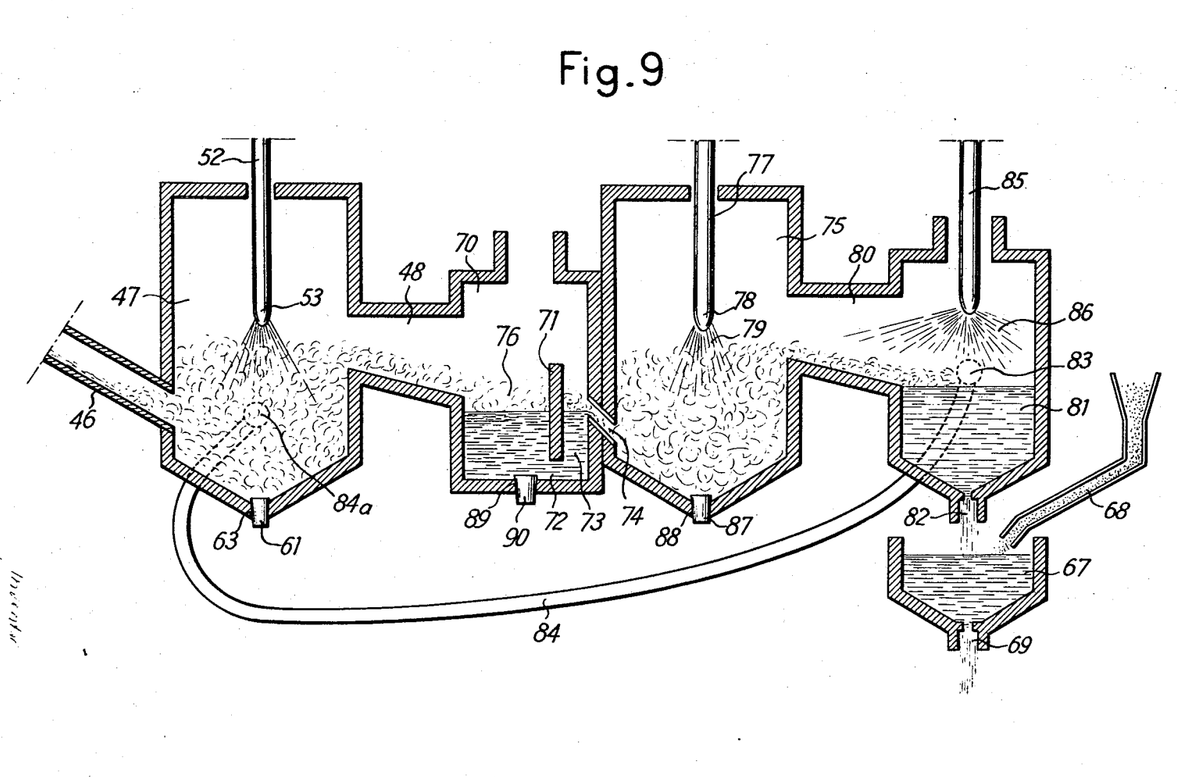
FIG. 9 is a similar view of an improvement in the method according to the invention.

FIG. 9 represents the diagram of a device in which two reactors are separated by a decanter. This mode of operation is particularly suited to the refining of phosphorous pig iron. There is again shown in this figure a number of elements which are common to those of FIG. 8 which will be designated by the same reference numerals. There has thus been shown the duct 46 for conveying the crude pig iron into the primary reactor 47 in which is fitted the nozzle 52 with mouthpiece 53. Said reactor 47 communicates through the passageway 48 with a decanter 70, there being provided in the interior of said decanter a partition wall 71, the bottom of which is pierced by an opening 72 and which projects to a substantial height above the level of the slag which is decanted into the decanter 70. The metal which has a higher density fills the bottom of the decanter, passes through the opening 72, rises within a compartment 73 of said decanter 70 then flows out through a duct 74 into a secondary reactor 75. The slag is discharged through a lateral opening 76. A nozzle 77 having a mouthpiece 78 serves to blow in a penetrating jet 79 of oxygen containing in suspension powdered lime and prereduced ore which is also in the powdered state. The emulsion formed is discharged through a passageway 80 into a final decanter 81 in which the emulsion is separated out.

The metal is discharged into the blending vessel 67 by way of an outlet nozzle 82. After processing in the vessel 67, the metal flows out through the outlet nozzle 69 towards a pouring device which has not been shown in the drawings, preferably for continuous casting. The slag flows out through an opening 83 of a pipe 84, the extremity of which opens at 84a within the reactor 47. Said slag is heated as a result of the combustion of CO which is derived from the refining of the metal within the reactor 75, said combustion being initiated by the oxygen derived from a nozzle 85 with divergent jet 86. Since in addition the slag contains up to 25% FeO which is a fluxing agent, the slag is sufficiently fluid to flow under gravity towards the reactor 47.

The reactors 47 and 75 are fitted with plugs 61 and 87 which are placed respectively in openings 63 and 88 which serve as drain holes. Similarly, the decanter 70 is provided with an opening 89 which is closed off by a plug 90 under normal operating conditions.

There will now be given a few data which are obtained as a result of the practical application of the process in accordance with the invention.

Figure 10:
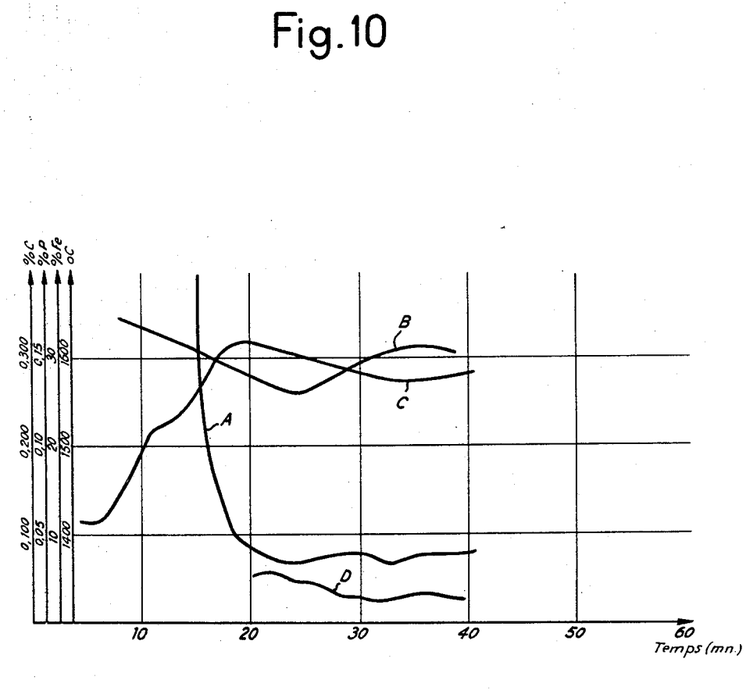
FIG. 10 is a graph showing the evolution of the refining, in one step, of a semihematite pig iron.

FIG. 10 represents the evolution of the refining process, in one step, of a semihematite pig iron having the following composition:

C=3.55%
P=0.40%
Si=0.51% the temperature of this latter being 1250° C. The rate of feed of pig iron is 211 kilograms per minute. There is blown in a volume of 10 N cubic meters per minute of oxygen containing lime and ore in suspension: the rate of feed of lime is 15 kilograms per minute whereas the rate of feed of ore containing 60% iron is 18 kilograms per minute.

The graph of FIG. 10 gives as a function of time the contents of the different constituent elements of the liquid bath which passes out of the decanter 7 and the temperature of the metal. It is found that, after the 22nd minute, a steady state is achieved.

Curve A represents the evolution of the carbon content of the liquid metal which remains around 0.06% starting from the 22nd minute.

Curve B indicates the proportion of iron contained in the slag which is of the order of 30% in steady-state operation.

Curve C represents the thermal evolution of the steel produced, the temperature of which fluctuates in the vicinity of 1580° C.

Curve D shows the phosphorus content which is located between 0.0101 and 0.030%.

The total time of the test was 42 minutes.

The output of steel was 197 kilograms per minute, which gives an iron yield of 92.7%.

Figure 11:
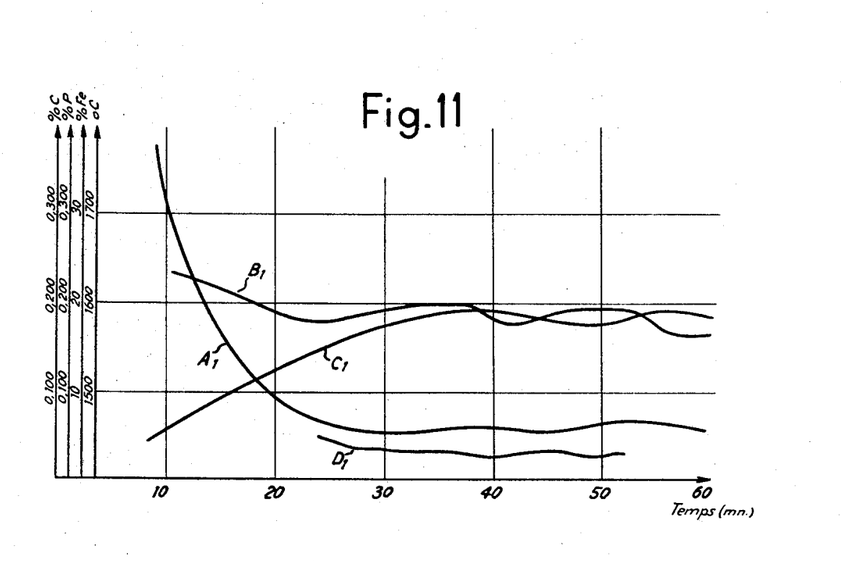
FIG. 11 is a similar graph showing the evolution of the refining, in one step, of a phosphorous pig iron.

FIG. 11 represents the evolution of the refining, in one step, of a phosphorus pig iron having the following initial composition:

C=3.8%
P=1.8%
Mn=0.5%
Si=0.3% the temperature of this latter being 1200° C.

There is blown into the liquid bath, which is fed in at a rate of 200 kilograms of pig iron per minute, 10 N cubic meters per minute of oxygen containing powdered lime and 63% iron ore. The rate of feed of lime is 26 kilograms per minute and the rate of feed of ore is 28 kilograms per minute.

The graph of FIG. 11 gives as a function of time the contents of the different constituent elements of the liquid bath as this latter passes out of the decanter 7 as well as the temperature of the metal. It is found that, after an operating time of 28 minutes, a steady state is achieved.

Curve $A_1$ represents the evolution of the carbon content of the liquid metal which, starting from the 28th minute, remains around 0.05%.

Curve $B_1$ indicates the iron content of the slag which is approximately 18%.

Curve $C_1$ indicates the thermal evolution of the metal bath, the temperature of which is in the vicinity of 1600° C.

Curve $D_1$ shows that, when a steady state is achieved, the proportion of phosphorus is approximately 0.03%.

The mean content of manganese is 0.10%.

The highly basic slag (51% CaO) contains 18% $P_2O_5$, which permits of its utilization as fertilizer under the same conditions as Thomas slags.

The gas derived from the refining process was partially burnt in vessel 3 and contains at the time of discharge 35% $CO_2$ and 65% CO.

The total time of the test was 62 minutes.

The output of steel is 194 kilograms per minute, which corresponds to an iron yield of 89.5%.

Figure 12:
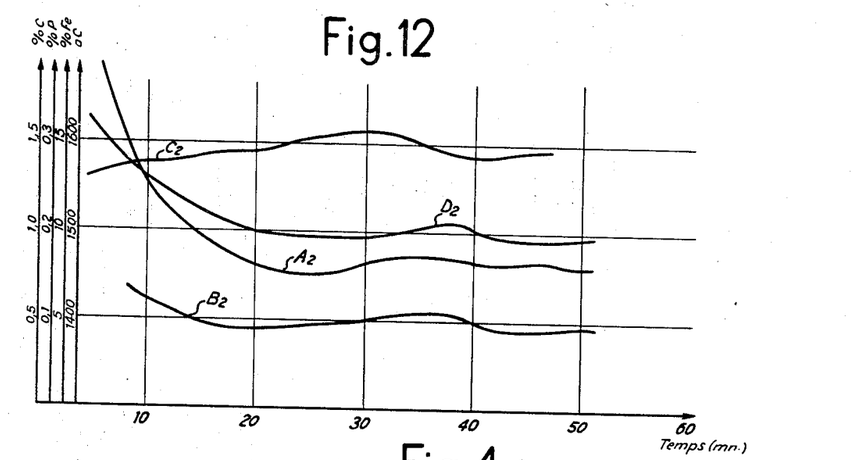
FIGS. 12 and 13 are two further graphs showing the evolution of the refining, in two steps, of a phosphorous pig iron.
Figure 13:
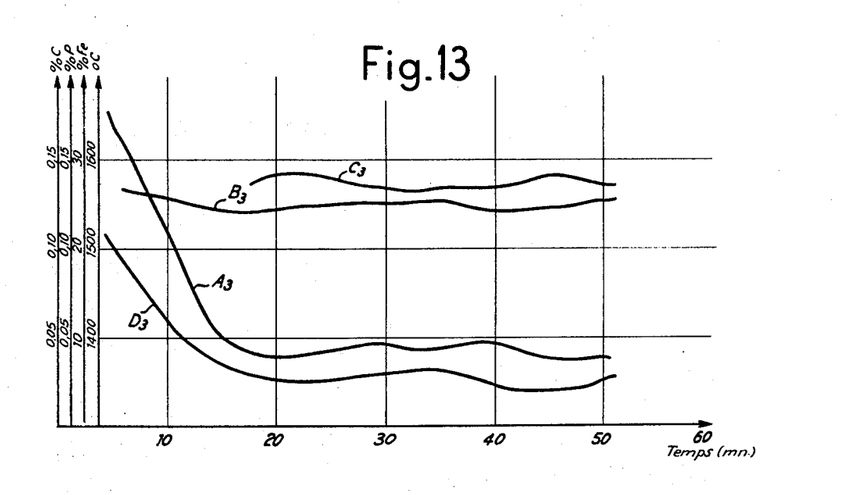

FIGS. 12 and 13 represent the evolution of the refining, in two steps, of a phosphorous pig iron at 1200° C. having the following composition:

C=3.8%
P=1.8%
Mn=0.6%
Si=0.4%

The vessel 47 which is shown in FIG. 8 is continuously supplied with liquid pig iron at the rate of 200 kilograms per minute. There is blown in through the nozzle 52 11 N cubic meters per minute of oxygen containing in suspension 20 kilograms of lime per minute and 20 kilograms per minute of 62% iron ore.

The graph of FIG. 12 gives as a function of time the proportions of the constituent elements of the liquid bath phich passes out the vessel 70 as well as the temperature of the metal (1st step). It is observed that, starting from the 20th minute, steady-state operation is achieved.

Curve $A_2$ represents the evolution of the carbon content of the metal; it is found that this value fluctuates in the vicinity of 0.8% starting from the 20th minute.

Curve $B_2$ indicates the iron content of the slag which is of the order of 5%.

Curve $C_2$ shows that the temperature of the metal fluctuates in the vicinity of 1600° C.

Curve $D_2$ shows the evolution of the dephosphorization process: after a period of 20 minutes, the phosphorus content of the metal has fallen to 0.2%.

The mean content of manganese is 0.2%.

The slag which is discharged from the decanter 70 through the opening 76 contains 5% CaO and 23% $P_2O_5$ and can be employed as fertilizer.

The deslagged metal is then fed into the reactor 75 in which it is subjected to a second refining step. A volume of 12.5 N cubic meters per minute of oxygen is blown into said reactor by means of the nozzle 77 through which are also introduced 5.2 kilograms of lime per minute and 7 kilograms of ore per minute.

The graph of FIG. 13 gives as a function of time the proportions of constituent elements of the liquid bath which passes out of the decanter 81. Steady-state operation is achieved after 18 minutes.

Curve $A_3$ represents the evolution of the carbon content which, in steady-state operation, fluctuates in the vicinity of 0.04%.

Curve $B_3$ indicates the iron content of the slag which is approximately 26%. In view of the fact that this was only an experimental installation, the slag derived from said decanter was not recycled.

Curve $C_3$ indicates the thermal evolution of the steel produced, the mean temperature of which is 1590° C.

Curve $D_3$ indicates the dephosphorization factor; it is observed that this latter is excellent, since, starting from the 18th minute, the percentage content of phosphorus is on the average only 0.025%.

The mean Mn content is 0.05%.

The total time of the test was 55 minutes.

The output of steel is 195 kilograms per minute, which corresponds to a yield of 92%.

It is obvious that variations and modifications may be resorted to by those skilled in the art without departing from the scope of the invention as disclosed in the present specification and defined by the appended claims.

What is claimed as new and desired to be secured by Letters Patent is:

1. In a process of refining pig iron which comprises top blowing pig iron in a refining vessel with an oxidizing gas, the improvement comprising producing a foaming slag on the molten metal, and removing at least part of said foaming slag by continuously overflowing from the refining vessel during at least part of the operation.

2. A process for refining pig iron according to claim 1, wherein the foaming slag contains fine particles of iron and collecting said overflowing foaming slag in a receptacle distinct from the refining vessel, and separating the slag from the iron entrained with it in said receptacle.

3. A process for refining pig iron according to claim 1, wherein the foaming slag formed contains fine particles of iron in suspension, removing said foaming slag containing fine particles of iron in suspension by continuously overflowing from the refining vessel into a receptacle distinct from said refining vessel, continuously adding iron into the refining vessel to make up for the loss of iron from said refining vessel, and separating the entrained iron from the entraining slag, said metal then passing continuously into a secondary refining vessel in which it is refined again by top blowing while the slag is collected in a slag ladle.

4. A process for the continuous refining of metal containing slag forming impurities comprising the steps of feeding said metal containing said slag forming impurities in liquid state into a refining vessel; introducing into said refining vessel refining gas adapted to react with said slag forming impurities in said metal so as to form a metal-slag foam consisting of a slag foam having said metal in subdivided form suspended therein; continuously transferring only said thus-formed metal-slag foam with said metal in subdivided form suspended therein into a decantation vessel; causing in said decantation vessel transformation of said metal-slag foam into a liquid slag and concentration of said metal in subdivided form into a separate continuous metal phase; and separately discharging said liquid slag and said continuous metal phase from said decantation vessel.

5. A process as defined in claim 4, wherein said refining gas is introduced into said refining vessel in such a manner as to transform all of said slag forming impurities in said metal fed into said refining vessel into a slag foam having all said metal in subdivided form suspended therein, and wherein all said thus-formed metal-slag foam having all said metal in subdivided form suspended therein is transferred into said decantation vessel.

6. A process as defined in claim 4, wherein only metal-slag foam having all said metal in subdivided form suspended therein from the upper region of said thus-formed metal-slag foam is transferred into said decantation vessel.

7. A process as defined in claim 4, wherein said thus-formed metal-slag foam having all said metal in subdivided form suspended therein has the shape of a metal-slag foam column and wherein said metal-slag foam is transferred from said column in said refining vessel into said decantation vessel at a point of said metal-slag foam column spaced upwardly from the lower end thereof.

8. A process as defined in claim 4, wherein said refining gas is introduced in such a manner that upon reaction with said slag forming impurities in said metal it forms a metal-slag foam having a volume which is at least double the volume of said metal containing said slag forming impurities introduced into said refining vessel.

9. A process as defined in claim 4, wherein said refining gas is introduced into said refining vessel in such a manner so as to form with said slag forming impurities in said, said metal-slag foam without any preceding formation of liquid slag, whereby all said slag forming impurities in said metal are directly converted into a slag foam having said metal in subdivided form suspended therein.

10. A process as defined in claim 4, wherein said refining gas contains powdered material in suspension.

11. A process as defined in claim 4, wherein the gas which passes out of the refining vessel is at least partially burned to heat the metal containing said slag forming impurities fed in liquid state into said refining vessel.

12. A process as defined in claim 4, wherein the gas which passes out of the refining vessel is at least partially burned within said decantation vessel.

13. A process as defined in claim 4, and including the step of blowing an oxidizing gas into the midst of said metal-slag foam in such a manner as to insure that substantially the entire volume of said oxidizing gas is contained within said metal-slag foam.

14. A process as defined in claim 13, wherein said refining gas contains powdered material in suspension.

15. A process as defined in claim 4, and including the step of blowing auxiliary oxygen into said liquid slag in the decantation vessel in order to improve the fluidity of said slag.

16. A process as defined in claim 15, wherein the oxygen which is blown into said slag contains a powdered flux in suspension.

17. A process as defined in claim 4, wherein a further treatment is effected in a third vessel with formation of scoria, and a final treatment is carried out in a fourth vessel.

18. A process as defined in claim 4, and including the step of feeding said continuous metal phase from said decantation vessel into a further refining vessel; introducing into said further refining vessel refining gas adapted to react with the material fed thereinto to form a metal-slag foam; continuously transferring only that such-formed metal-slag foam into a further decantation vessel; causing in said further decantation vessel transformation of said metal-slag foam into liquid slag and concentration of said metal into a separate continuous metal phase; and separately discharging said liquid slag and said continuous metal phase from said further decantation vessel.

19. A process as defined in claim 1, wherein the foaming slag formed contains fine particles of iron in suspension; removing said foaming slag containing fine particles of iron in suspension by continuously overflowing from the refining vessel into a receptacle distinct from said refining vessel; continuously adding iron into the refining vessel to make up for the loss of iron from said refining vessel; and separating the entrained iron from the entrained slag, said metal then passing continuously into a secondary refining vessel in which it is refined again by top blowing.

20. A process for the continuous refining of metals, and more particularly of pig iron, in which refining substances are brought into contact with a stream of liquid metal, comprising the steps of feeding the liquid metal stream into at least one refining vessel, blowing into said vessel a jet of refining gas with sufficient power to form a metal-slag foam, continuously discharging said metal-slag foam from said refining vessel by overflow into a subsequently-arranged decantation vessel, effecting a decantation of the foam in said decantation vessel into a slag phase and a metal phase, blowing auxiliary oxygen into the slag phase within the decantation vessel so as to improve the fluidity of said phase, and discharging the metal phase and the slag phase separately from one another from said decantation vessel.

(References on following page)

References Cited

UNITED STATES PATENTS

| | | | |
|---|---|---|---|
| 2,682,810 | 12/1958 | Alexandrovsky | 75—60 |
| 2,962,277 | 11/1960 | Morrill | 75—60 |
| 3,275,432 | 9/1966 | Alexandrovsky | 75—60 |
| 2,950,186 | 8/1960 | Allard et al. | 75—60 |
| 2,991,173 | 7/1961 | Trentini et al. | 75—52 |

FOREIGN PATENTS 785,337　10/1957　Great Britain.

RICHARD O. DEAN, Primary Examiner

U.S. Cl. X.R.

75—51, 52, 59, 60